April 30, 1963     E. A. FRIEDMAN     3,087,453
CARGO STOWING ARRANGEMENT
Filed Sept. 29, 1961     2 Sheets-Sheet 2
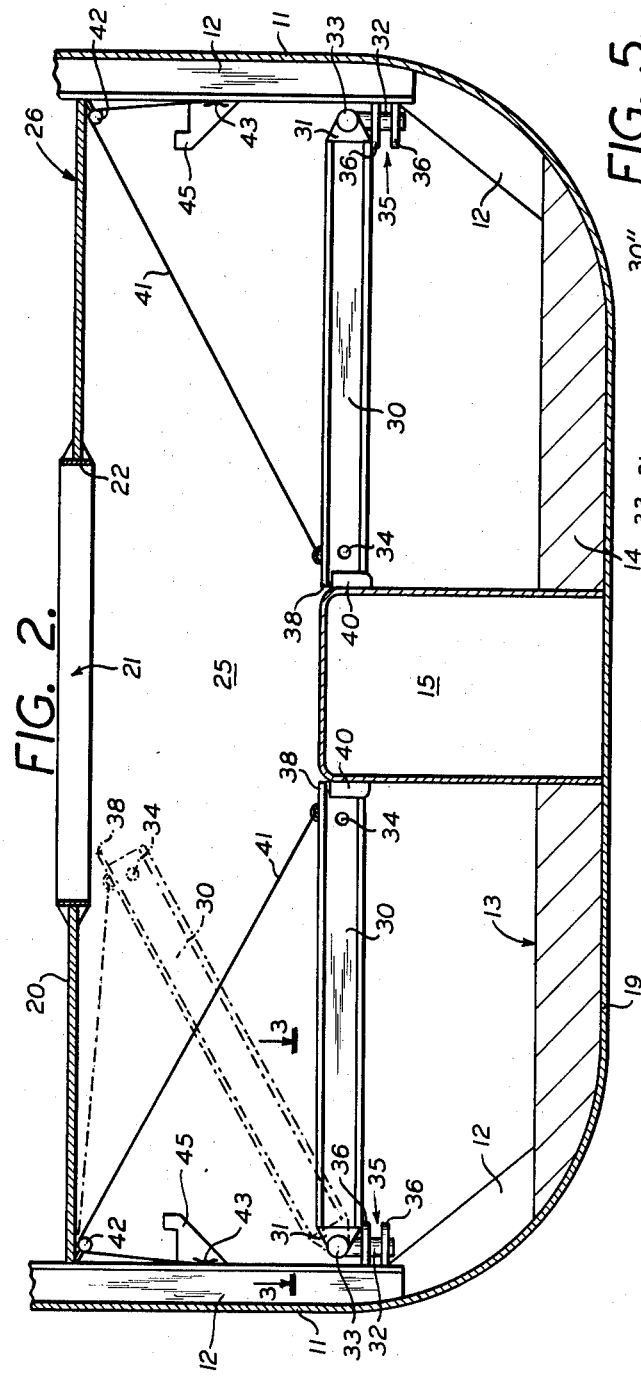
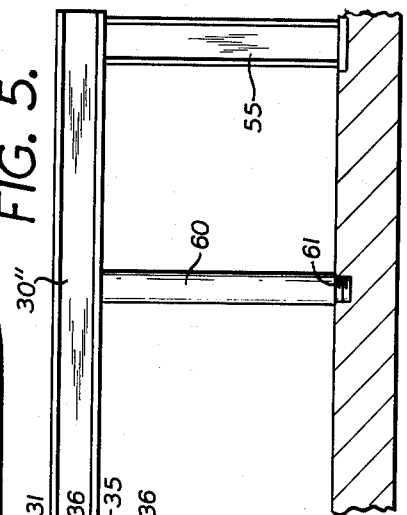
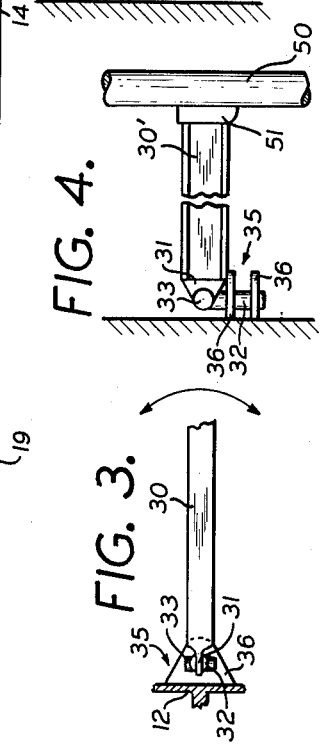
INVENTOR
ELLIOTT A. FRIEDMAN
BY Blum, Moscovitz,
Friedman and Blum
ATTORNEYS.

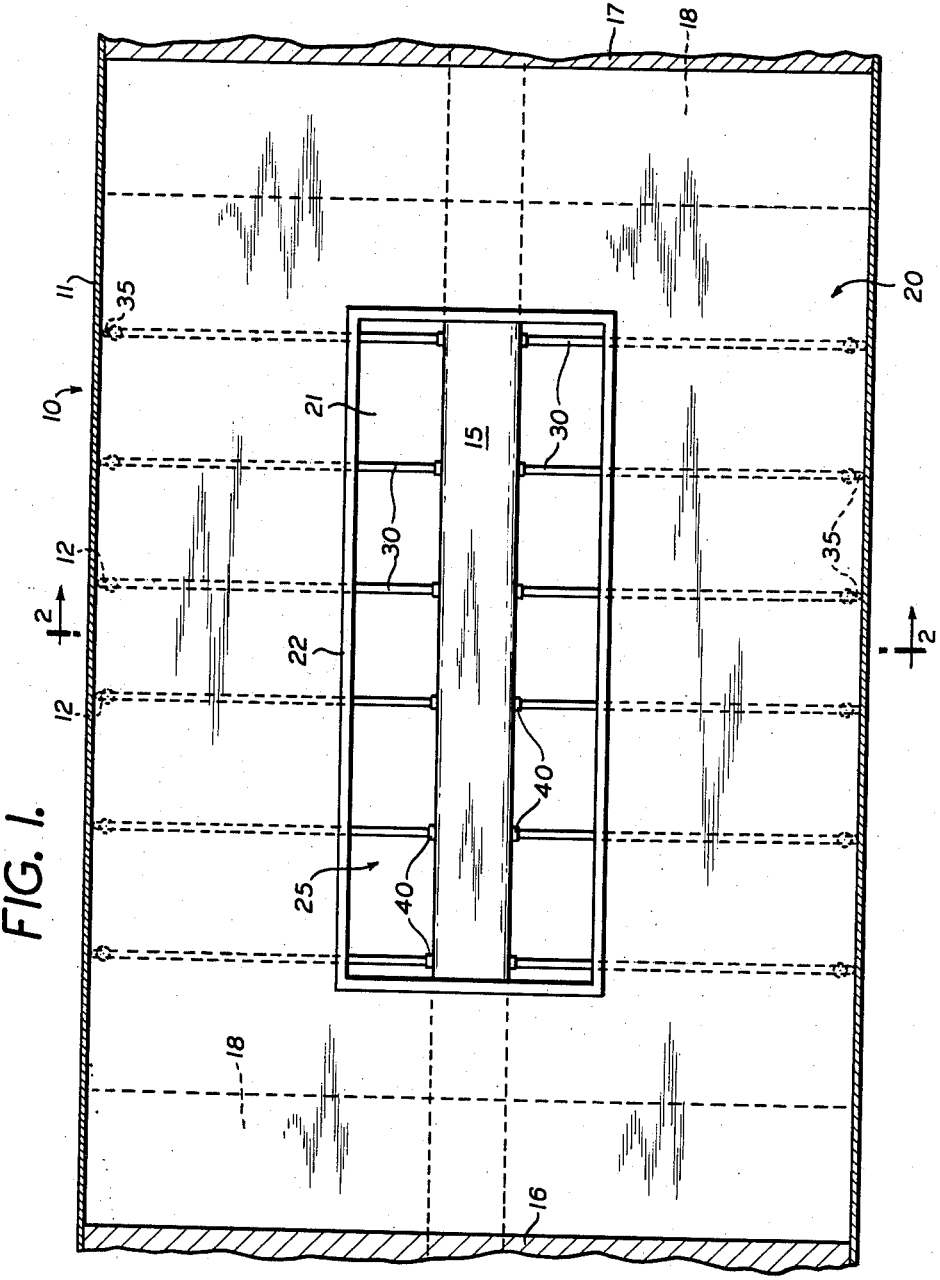

United States Patent Office 3,087,453
Patented Apr. 30, 1963

3,087,453
CARGO STOWING ARRANGEMENT
Elliott A. Friedman, Bronx, N.Y. (% Marine Consultants, Inc., 77 River St., Hoboken, N.J.)
Filed Sept. 29, 1961, Ser. No. 141,727
4 Claims. (Cl. 114—72)

This invention relates to cargo stowing arrangements, and more particularly, to a novel removable deck arrangement whereby the lower hold of a dry cargo vessel may be readily subdivided into two superposed cargo stowage spaces by support means forming a permanent part of the vessel.

In the present design of most dry cargo vessels, the holds are generally divided vertically into three spaces designated as the "lower hold," the "lower 'tween deck," and the "upper 'tween deck." Generally, the height of the lower hold is equal to substantially one-half the vertical distance from the tank tops to the main deck. For stability purposes, cargos of high density are stowed in the lower hold and cargos of lighter weight and lower density are stowed in the 'tween decks. The lower hold can also be used advantageously for handling extra large pieces of cargo.

It is a customary practice, when the lower hold is not completely filled with heavy cargo, to place dunnage over the cargo stowed therein to form a second cargo space for storage of lighter cargo over the already stowed heavier cargo. This involves relatively heavy expenses in time and money for the wages of longshoremen and riggers, as well as the actual cost of the dunnage, the laying of the dunnage, and the cleaning of the hatch after use. In addition, and more importantly, there is danger of the cargo stowed under the floor formed by the dunnage being crushed by accidentally placing too heavy cargo thereover.

One difficulty preventing the installation of a more sturdy deck over cargo stowed in the lower hold has been the problem of moving relatively rigid beams into the lower hold. This problem results from the fact that the overhang of the 'tween deck makes it very difficult and economically unfeasible, with present equipment, to position relatively heavy beams in place to subdivide the lower hold.

In accordance with the present invention, a sturdy, rigid, and reuseable deck arrangement for the lower hold is provided by support means which are permanently connected to the vessel and which may be either swung into position to support a deck or swung back out of the way when it is desired to utilize the entire lower hold for storage of relatively large and/or heavy equipment. These beams, which are arranged to extend transversely of the vessel and through about one-half of its width, are pivoted to the sides of the lower hold by universal joints or goosenecks which allow the beams to be swung both vertically and horizontally. Thereby, the beams can be raised so that free ends will be disengaged from a suitable beam socket, and then swung back to lie against the side bulkheads of the lower hold where they will rest in suitable beam rests. When it is desired to use the beams, they may be readily swung out into position to support a deck.

Generally, the lower hold of a dry cargo vessel is subdivided longitudinally by the shaft tunnel, at least in its aftersection. Accordingly, a convenient arrangement of the present invention involves the positioning of beam rests on this shaft tunnel. In such case, the beams have topping lifts fastened to their free ends and extending through fairlead blocks, usually snatchblocks, so that the beam ends may be lifted by the cargo hook from the beam sockets, and the topping lifts may then have the slack removed therefrom and be secured to cleats. The beams may then be swung laterally against the wall of the lower hold.

While the shaft tunnel provides a convenient frame support for the beam rests, other arrangements are equally suitable such as providing the beam sockets on deck supporting pillars extending longitudinally of the lower hold, or by providing stanchions which may be set into sockets or recesses in the tank top and arranged to support the free ends of the beams.

In operation, after the beams have been swung into position, with alternate beams being "king" beams and intermediate beams "lazy" beams, wooden hatch boards, which have been stowed, for example on the "orlop" deck or in any other suitable place, are placed over the beams to form the deck subdividing the lower hold. When it is desired to use the entire capacity of the lower hold for relatively large and/or heavy cargo, these hatch boards can be removed from the beams and stowed, as mentioned, after which the beams are swung out of the way against the side bulkheads of the lower hold.

For an understanding of the principles of the invention, reference is made to the following description of typical embodiments thereof as illustrated in the accompanying drawings. In the drawings:

FIG. 1 is a somewhat schematic plan view of a dry cargo vessel illustrating the hatch, for access to the lower hold, and the shaft tunnel;

FIG. 2 is a transverse sectional view of a dry cargo vessel, taken on the line 2—2 of FIG. 1;

FIG. 3 is a plan view, partly in section, taken on the line 3—3 of FIG. 2;

FIG. 4 is a partial transverse elevational view, corresponding to FIG. 2, and illustrating a modification of the invention; and FIG. 5 is a view similar to FIG. 4 illustrating a further modification of the invention.

Referring more particularly to FIGS. 1, 2 and 3, a vessel 10 is illustrated as having side plates 11, framing 12, and a bottom 19, immediately above which are the tanks 14. Extending along the bottom 19, is the usual shaft tunnel 15 for the propeller shaft or shafts. The tops 13 of tanks 14, side walls or sides 11, and a 'tween deck 20 define a lower hold 25 which is longitudinally defined by a forward bulkhead 16 and an aft bulkhead 17. This lower hold may be provided with the usual orlop decks 18.

Lower 'tween deck 20, as well as the upper 'tween deck (not shown) is formed with a hatch opening 21, which is preferably rectangular and elongated and is bounded by a hatch coaming 22. Above the lower 'tween deck 20 is the lower 'tween deck hold 26, only part of which is illustrated in FIG. 2.

In accordance with the present invention, a firm support for a removable deck, to be placed over cargo stowed in the lower hold but not completely filling the lower hold to its full vertical height, is provided by a plurality of beams 30 which are permanently pivotally mounted on the framing 12 of the vessel in such a manner that they may be swung both laterally and vertically. For this purpose, one end of each beam is pivotally mounted on a beamstep 35 secured to framing 12 and which is basically identical with the usual boomstep provided aboard ship for cargo booms and the like. As illustrated, each beamstep 35 comprises a pair of vertically spaced plates 36, 36 which are welded or riveted to framing 12 and are formed with vertically aligned apertures. While a particular form of beamstep has been illustrated in the drawings, it will be understood that the beamstep may take other structural forms provided it functions in the same manner as the illustrated beamsteps 35.

For cooperation with the beamsteps 35, the pivot end of each beam 30 has a web portion 31 extending therefrom and fitted in an axial slot in the upper end of a pin 32. Pin 32 and web extension 31 are formed with aligned circular apertures receiving a pin 33 pivotally anchoring beam 30 to pin 32 for swinging movement in a vertical direction. The pins 32 are engaged through the apertures in the plates 36 to provide for horizontal swinging movement of the beams 30.

Adjacent its free end, each beam 30, which is preferably an I-beam, has its web formed with an aperture 34 for receiving a cargo hook or the like. In the arrangement shown in FIGS. 1, 2 and 3, beam sockets 40 are secured to the shaft tunnel 15, each in lateral alignment with a beamstep 35.

The arrangement operates in the following manner. Normally, the beams 30 are swung against the sides 11 or the framing 12 where the beams rest in beamrests 45. A topping lift wire 41 is disengageably secured to the free end of the beam and passes through a block 42 to a cleat 43. To swing beams 30 into operative position, topping lift wire 41 is lead through a fairlead block, which is usually a snatch block, and the eye on the fairlead wire is then made fast to the cargo hook. A strain is then taken on the topping lift wire 41 to lift the particular beam 30 out of its beamrest 45. During this movement, the beam will pivot about the pin 33 under the control of a tagline. After the beam 30 is lifted from its beamrest 45, it may be swung about the pivot pin 32 to a position where its free end is disposed over the beam socket 40 laterally aligned with its beamstep 35. The topping lift wire is then slacked until the end of the beam 30 is inserted into and rests in the beam socket 40. Topping lift wire 41, being slack, is then disconnected from the beam, and the hatchboards, which may be stowed on the orlop decks 18 or in any other suitable place, are placed in position over the beams 30.

In this connection, it is preferred that alaternate beams 30 be "king" beams and intermediate beams 30 be "lazy" beams. This means that each hatchboard will extend between the centers of two adjacent king beams and over the intermediate lazy beam. If desired, the upper flanges of the king beams could be provided with central ribs to assure proper positioning of the hatchboards.

To remove the temporary deck, the hatchboards are first removed and stowed on the orlop decks or in any other suitable place. The cargo hook is then fitted in the opening 34 in the end of each beam 30 and the free end of the beam is then lifted to a suitable height by the cargo hook, as illustrated in FIG. 2 in broken lines. The topping lift wire has meanwhile been attached to its associated beam, and the slack is then taken out of the topping lift and the wire is made fast to the cleat 43. The cargo hook is then disengaged from the aperture 34, and the beam 30 is pivoted to swing about pin 32, being preferably kept under control by a tagline. When the beam 30 reaches the side 11 of the vessel, topping lift wire 41 is slacked away and the beam falls into place on its beamrest 45.

FIG. 4 illustrates an alternative arrangement which may be used in portions of the vessel not having the shaft tunnel 15 extending therethrough. The main supports of the several decks are usually pillars, such as the pillar 50 illustrated in FIG. 4. These pillars can be fitted with appropriate sockets or other suitable receptacles, as illustrated in FIG. 4 at 51 to support the free ends of the beams.

Another arrangement is shown in FIG. 5, wherein the beam 30" has its free end resting on a pillar or stanchion 55 which may be either permanently or removably secured on a tank top. Suitable socket arrangements may be used to properly position the free end of each beam 30" with respect to the associated stanchion 55, these arrangements not being illustrated in FIG. 5, as they will be obvious to anyone skilled in the art.

FIG. 5 also illustrates a further feature of the invention which may be utilized when the beams 30, 30', or 30" are longer than usual. In such cases, a removable stanchion 60 may be inserted into socket 61 in the tank top, socket 61 being located at positions intermediate the length of the beams 30". It should be noted that the intermediate stanchions 60 removably engageable in the socket 61 may be used in the embodiment of FIGS. 1, 2 and 3 and also in the embodiment of FIG. 4, as well as in the embodiment of FIG. 5. The arrangements shown in FIGS. 4 and 5 operate, insofar as positioning and removal of the beams 30 is concerned, in the same manner as previously described for the arrangement of FIGS. 1, 2 and 3.

While specific embodiments of the invention have been shown and described in detail to illustrate the application of the principles of the invention, it should be understood that the invention may be embodied otherwise without departing from such principles.

What is claimed is:

1. In a dry cargo navigable vessel having a lower hold accessible through hatchways in 'tween decks, and having a shaft tunnel, cargo stowing means, for subdividing the lower hold vertically, comprising, in combination, a plurality of beam steps secured in longitudinally spaced relation to side framing of the vessel at a common level intermediate the height of the lower hold; a plurality of beam supports arranged on the shaft tunnel in laterally spaced relation to said beam steps and each substantially aligned, laterally and horizontally, with a respective beam step; a plurality of vertically extending pins each rotatably mounted in a respective beam step; a plurality of horizontally extending pins each secured to a respective vertically extending pin for rotation with the latter about a substantially vertical axis; and a plurality of deck support beams each having one end secured to a respective horizontally extending pin and its opposite end engageable in a respective beam support, whereby said beams may be swung, relative to the associated beam supports, about both vertical and horizontal axes for extension between a retracted position, in which each beam lies against the side framing of the vessel and an extended position in which each beam extends from its respective beam step to the shaft tunnel so that hatchboards may be laid over the extended support beams to provide a firm deck for cargo stowage intermediate the height of the lower hold.

2. Cargo stowing means, as claimed in claim 1, including beamrests secured in longitudinally spaced relation to such side framing at a level above that of said beam steps, for supporting the deck support beams when the latter are swung to engage said side framing.

3. Cargo stowing means, as claimed in claim 1, including a plurality of support stanchions, each removably mountable intermediate the length of an extended beam and engageable with the latter to provide additional support therefor.

4. Cargo stowing means, as claimed in claim 3, in which each of said stanchions is insertable into a socket in the floor of the lower hold.

References Cited in the file of this patent

UNITED STATES PATENTS

| 2,364,928 | Thompson | Dec. 12, 1944 |
| 2,699,746 | Kendall et al. | Jan. 18, 1955 |
| 2,736,287 | Kummerman | Feb. 28, 1956 |

FOREIGN PATENTS

| 1,232,243 | France | Apr. 19, 1960 |
| 860,598 | Great Britain | Feb. 8, 1961 |